United States Patent [19]

Rowland et al.

[11] Patent Number: 5,387,635
[45] Date of Patent: * Feb. 7, 1995

[54] AQUEOUS DISPERSIONS OF ETHYLENE/α,β-UNSATURATED CARBOXYLIC ACID INTERPOLYMERS

[75] Inventors: Michael E. Rowland, Lake Jackson; Kenneth E. Springs, Clute, both of Tex.

[73] Assignee: The Dow Chemical Company, Midland, Mich.

[*] Notice: The portion of the term of this patent subsequent to Apr. 27, 2010 has been disclaimed.

[21] Appl. No.: 924,032

[22] PCT Filed: Jan. 24, 1992

[86] PCT No.: PCT/US92/00622

§ 371 Date: Aug. 27, 1992

§ 102(e) Date: Aug. 27, 1992

[87] PCT Pub. No.: WO92/13012

PCT Pub. Date: Aug. 6, 1992

[51] Int. Cl.$^6$ .................................................. C08K 5/00
[52] U.S. Cl. ........................ 524/379; 524/522; 524/556; 525/329.9; 525/330.2; 525/369; 525/378; 525/380
[58] Field of Search ................. 524/522, 556, 379; 525/378, 369, 380, 329.9, 330.2

[56] References Cited

U.S. PATENT DOCUMENTS

| | | | |
|---|---|---|---|
| 3,347,811 | 10/1967 | Bissot | 524/556 X |
| 3,389,109 | 6/1968 | Harmon et al. | 524/556 X |
| 3,472,825 | 10/1969 | Walter et al. | 525/330.2 |
| 3,511,799 | 5/1970 | Clampitt | 524/556 X |
| 3,541,033 | 11/1970 | Buttrick et al. | 524/556 |
| 3,644,258 | 2/1972 | Moore et al. | 524/556 X |
| 3,677,989 | 7/1972 | Jenkinson | 524/556 |
| 3,790,521 | 2/1974 | McCann et al. | 524/556 X |
| 3,798,194 | 3/1974 | McCann et al. | 524/556 X |
| 3,799,901 | 3/1974 | McCann et al. | 524/556 X |
| 4,173,669 | 11/1979 | Ashida et al. | 524/556 X |
| 4,410,655 | 10/1983 | Funakoshi et al. | 524/522 |
| 5,206,279 | 4/1993 | Rowland et al. | 524/556 X |

*Primary Examiner*—Judy M. Reddick

[57] ABSTRACT

Aqueous dispersions of ethylene/α,β-unsaturated carboxylic acid interpolymers (e.g., random ethylene/acrylic acid interpolymers) are formed using a mixture of bases at a concentration of at least 0.2 equivalents of base per mole of α,β-unsaturated carboxylic acid. The dispersions have at least 10 weight percent dispersed solids and not more than 1 weight percent of the initial polymer in non-dispersed form. Preferred bases for use in forming the dispersions are ammonium hydroxide and/or alkali metal hydroxides. A mixture of ammonium hydroxide and potassium hydroxide is especially preferred for forming the dispersions with ethylene/acrylic acid interpolymers at an ammonium hydroxide:acrylic acid molar ratio of 1:1 and a potassium hydroxide:acrylic acid molar ratio in the range of 0.6–0.8:1. The dispersions are particularly useful in forming thin coatings of adhesive on substrates, such as paper and metal foil, using conventional techniques.

11 Claims, No Drawings

AQUEOUS DISPERSIONS OF ETHYLENE/α,β-UNSATURATED CARBOXYLIC ACID INTERPOLYMERS

This invention relates to an improved method of forming aqueous dispersions from ethylene/α,β-unsaturated carboxylic acid interpolymers (e.g., ethylene/acrylic acid). More particularly, the invention relates to a method of forming dispersions which have a high solids content and contain not more than about 1 percent by weight non-dispersibles.

Ethylene/α,β-unsaturated carboxylic acid interpolymers are thermoplastic polymers which are useful as adhesives. An adhesive layer or coating of the interpolymers can be applied to a substrate, such as paper or metal foil, by extrusion coating or other conventional techniques. The coating thickness, however, cannot be reduced much beyond about 0.4 mils, or about 6 pounds per ream, due primarily to the melt strength of the interpolymer. The line speed and the die/system design also affect the ability of the interpolymer to coat the substrate at minimal thicknesses. Generally, such coatings are thicker than necessary to provide the desired properties in a laminate structure. Thinner coatings would be preferred from an economic standpoint.

Thin coatings have been applied to substrates using a gravure or meyer rod technique and an aqueous dispersion of the polymeric adhesive, but the dispersions have been only available at low solids concentrations.

Many methods of forming dispersions from ethylene/α,β-unsaturated carboxylic acid interpolymers are disclosed in the literature. One method involves neutralizing at least a portion of the carboxylic acid groups with an alkaline base to form a dispersible carboxylic acid salt. The dispersions formed using this technique, especially when the α,β-unsaturated carboxylic acid content is low or the molecular weight of the interpolymer is high, typically have a high content of non-dispersibles, i.e., greater than 1 percent. When such dispersions are coated onto a substrate, the coating tends to be uneven and variable and, in addition, can contaminate the equipment due to the high percentage of non-dispersibles. The non-dispersibles foul the equipment and cause equipment shutdown and subsequent cleanup. If more aqueous base is utilized to reduce the non-dispersibles content, the percentage of dispersed solids decreases even further and makes the overall process uneconomical. Dispersions of interpolymers having low carboxylic acid content (e.g., less than about 15 percent acid content) are particularly difficult to form.

International Patent Application Publication Number WO 89/07519 (Patton et al.) discloses a number of techniques for forming dispersions from ethylene/α,β-unsaturated carboxylic acid interpolymers, including using a combination of alkali metal hydroxide and ammonia solution. Patton et al. did not recognize, nor do they suggest, using a mixture of bases in the proportions set forth below.

An improved method of forming a dispersion of at least one ethylene/α,β-unsaturated carboxylic acid interpolymer has now been discovered. The method comprises contacting the interpolymer in a stirred aqueous medium with a mixture of bases at a concentration of at least 0.2 equivalents of base per mole of α,β-unsaturated carboxylic acid, thereby forming novel aqueous dispersions having at least 10 weight percent of dispersed solids, total weight basis, and not more than 1 weight percent of non-dispersibles, based on the weight of the interpolymer. The preferred bases are ammonium hydroxide and an alkali metal hydroxides. Lithium hydroxide, potassium hydroxide and sodium hydroxide are preferred alkali metal hydroxides. The solids content of the dispersion is preferably 25 weight percent or more, total weight basis.

The adhesive dispersions formed using the method of the present invention can surprisingly be coated onto a substrate at a film thickness as thin as 0.15 mils (or, when coating paper, 2.25 pounds per ream) and possibly even thinner. This coating thickness is very desirable from an economic standpoint as well as an aesthetic standpoint, especially when coating cellulosics.

In addition, since the dispersions formed using the method of the present invention have low percentages of non-dispersibles, they cause less equipment fouling.

Ethylene/α,β-unsaturated carboxylic acid interpolymers form a known class of compounds, any one of which can be used in the present invention. Mixtures of the ethylene/α,β-unsaturated carboxylic acid interpolymers are useful within the scope of this invention as well. The preferred ethylene/α,β-unsaturated carboxylic acid interpolymer for use in the present invention, however, is a random ethylene/acrylic acid interpolymer. For example, PRIMACOR® Adhesive Polymers made by The Dow Chemical Company are random ethylene/acrylic acid (EAA) interpolymers suitable for use in practicing this invention.

The interpolymers useful in this invention are prepared by known techniques. Typically, such polymers are interpolymers of ethylene and acrylic acid (AA) or methacrylic acid (MAA). Other α,β-unsaturated carboxylic acids suitable for interpolymerization with ethylene for use in the present invention include but are not limited to, e.g., maleic acid and fumaric acid.

One method of preparing such random interpolymers is disclosed in U.S. Pat. No. 3,520,861 (Thomson et al.) and another is disclosed in U.S. Pat. No. 4,351,931 (Armitage). Another method is disclosed in U.S. Pat. No. 4,599,392 (McKinney et al.) and in U.S. Pat. No. 4,988,781. Non-random ethylene/α,β-unsaturated carboxylic acid interpolymers can be prepared by the methods disclosed in U.S. Pat. No. 4,248,990 (Pieski et al.) and in U.S. Pat. No. 4,252,924 (Chatterjee). Other methods of manufacturing interpolymers of ethylene and α,β-unsaturated carboxylic acid(s), such as grafting acrylic acid onto an ethylene polymer or copolymer of ethylene as disclosed in U.S. Pat. No. 3,177,269, are also within the scope of this invention. The term interpolymers used in describing the present invention includes copolymers and terpolymers (e.g., ethylene/n-butyl acrylate/acrylic acid) and other interpolymers.

The molecular weight of the random ethylene/acrylic acid interpolymers useful in forming dispersions in the present invention is indicated as melt index (MI) and can be from 1 gram/10 minutes (g/10 min) to 5000 g/10 min. The melt index is measured according to ASTM D 1238 Condition E (190° C./2.16 kg), unless reported otherwise. The preferred melt index range of the random ethylene/acrylic acid interpolymer is from 5 g/10 min to 300 g/10 min. The methods described herein are particularly effective for forming dispersions from relatively high molecular weight interpolymers (i.e., interpolymers having a melt index of from 10 g/10 minute to 30 g/10 minute).

Surprisingly, even ethylene/acrylic acid interpolymers having very low acrylic acid content, as low as 3 percent acrylic acid by weight of the interpolymer, can be dispersed using the methods described herein. Accordingly, the acrylic acid content of the ethylene/acrylic acid interpolymers is at least 7 percent, preferably from 7 percent to 50 percent by weight of the interpolymer. The especially preferred acrylic acid content range of the random ethylene/acrylic acid interpolymer is from 8 percent to 30 percent by weight of the interpolymer.

In addition, ethylene/acrylic acid interpolymers having either relatively high molecular weights and/or low acid content can be dispersed using the methods described herein.

The mixture of bases useful for forming the dispersions of the present invention can be any that react with the $\alpha,\beta$-unsaturated carboxylic acid functionality, such as alkali metal hydroxides, amines, ammonium hydroxide and various carbonates (e.g., or sodium carbonate). Amines suitable for practicing the present invention are, e.g., monoethanolamine and diethanolamine. Preferred bases are ammonium hydroxide and/or alkali metal hydroxides. Lithium hydroxide, potassium hydroxide and sodium hydroxide are preferred alkali metal hydroxides. When ammonium hydroxide is used in the invention for forming the dispersion, the most preferred alkali metal hydroxide for forming the mixture is potassium hydroxide. Mixtures are effective when mixed at specific ratios sufficient to disperse the interpolymer, particularly at a total ratio of from 1.5:1 to 3:1. For an EAA having 10 percent AA and 20 MI, the dispersing bases are especially effective when the ammonium hydroxide:acrylic acid molar ratio is 1:1 and the potassium hydroxide:acrylic acid molar ratio is in the range of 0.6–0.8:1.

The alkali metal hydroxides and/or ammonium hydroxide mixture can be formed by mixing together in an aqueous medium in-situ and then contacting with the interpolymer. This in-situ mixing method is preferable to contacting the interpolymer sequentially.

The interpolymer can, however, be contacted sequentially first with one of the alkali metal hydroxides, either in an aqueous or non-aqueous environment, and then contacted with another of the alkali hydroxides (or ammonium hydroxide) in an aqueous medium to form the aqueous dispersion. For example, a sodium ionomer made from EMAA and sold by E.I DuPont de Nemours & Company trademarked Surlyn TM 1601 can be used as the starting material and subsequently contacted with ammonium hydroxide in an aqueous environment and thus dispersed.

Added surfactants are not required in forming the novel dispersion, but they can-be included along with other conventional additives so long as they do not affect the stability of the formed dispersion. Typical additives include, e.g., pigments, antioxidants, defoamers, wetting agents (e.g., hexanol), and rosin tackifiers (e.g., that disclosed in U.S. Pat. No. 4,714,728 (Graham et al.).

Preferably, the mixture of hydroxides and interpolymer are agitated or otherwise stirred sufficiently such that the hydroxide mixture readily contacts the interpolymer. The temperature of the stirred hydroxide/interpolymer mixture (i.e., digestion temperature) can be ambient or above, but is preferably from 60° C. to 150° C.

The non-dispersibles of the dispersions formed using the methods of the present invention are characterized by filtering the dispersion through a 100 mesh screen, drying the filtrate and weighing. Percent non-dispersibles is calculated by dividing the weight of the dried filtrate by the weight of the total polymer charged to the system multiplied by 100. The solids content of the dispersions is determined by removing an aliquot of the dispersion, recording its wet weight and subsequently drying under heat until the weight change is minimal. The solids content is recorded as the dry weight of the dispersion aliquot, after removal of non-dispersibles, divided by the wet weight of the aliquot, multiplied by 100. In general, as the solids content of the dispersion increases, the viscosity of the dispersion increases. Practical high solids dispersions for ease of application can have a viscosity as high as 2000 centipoise (cps), although lower viscosity dispersions are preferable.

Particle size and distribution of the dispersions described herein can be varied dependent upon the end use application of the dispersion. The mean volume diameter particle size of the dispersions formed by this invention are generally within the range of 100–10,000 Angstroms and preferably within the range of 200–3000 Angstroms.

The aqueous dispersions formed using the present invention can be diluted with an aqueous alcohol of 1 to 4 carbon atoms (e.g., methanol, ethanol or isopropanol). The addition of aqueous alcohol can reduce the viscosity and can speed drying time and consequently increase line speed during applications.

The dispersions of the present invention can be applied to a variety of substrates, including, e.g., cellulosics (e.g., paper sizing or coating), metal foil, metal foil coatings, non-woven fabric coatings and polymeric film. The dispersions of the present invention can be applied using a gravure roll or meyer rod application technique, or any other dispersion application techniques commonly employed in the industry.

EXAMPLE 1 AND COMPARATIVE EXAMPLES 2 AND 3

A 27 weight percent acrylic acid copolymer with a melt index of 15 grams/10 minutes was dispersed in various alkaline aqueous metal hydroxide solutions according to the recipes listed in Table 1. The neutralization level for all samples (moles acid:moles base) was a constant 2.5.

TABLE 1

| Sample Number | Resin (grams) | NH4OH (grams) | KOH (grams) | H2O (grams) |
|---|---|---|---|---|
| 1 | 10.00 | 3.72 | 2.34 | 83.94 |
| 2* | 10.00 | 0.00 | 5.85 | 84.15 |
| 3* | 10.00 | 6.20 | 0.00 | 83.80 |

*Comparative example only; not an example of the invention

The test samples were each made by directly placing all ingredients in a 150 ml 3 neck round bottom flask fitted with a condenser, a thermometer and an air driven stirrer. Water was added into the flask first, then the resin. In sample 1, the KOH was added next and then the NH4OH added last and the flask was closed. The continuously stirred samples were heated to 95° C. and held constant. The samples were cooled to 50° C. and filtered through a tared 100 mesh stainless steel screen. The amount of material remaining on the screen after rinsing and drying for 24 hours at 90° C. was termed "non-dispersibles". The percent non-dispersibles was calculated by dividing the grams of material retained in the filter by the initial weight of resin added to the flask. The solids content of the dispersions was obtained by removing an aliquot of the filtered dispersion, recording its wet weight and subsequently drying under heat until the weight change was minimal. The solids content was recorded as the dry weight of the dispersion aliquot after removal of non-dispersibles, divided by the wet weight of the aliquot, multiplied by 100. The results for the three dispersions prepared according to the above recipes are tabulated below in Table 2.

TABLE 2

| Example | Non-dispersible (weight percent) | Stable Viscosity (cps) | Approximate Solids Content (weight percent) |
|---|---|---|---|
| 1 | 0.32 | 29 | 11.5 |
| 2* | 85.0 | 10 | 2.1 |
| 3* | 64.2 | 14 | 3.6 |

*Comparative example only; not an example of the invention

Non-dispersibles greater than 1.0 percent by weight were excessive and the dispersion was considered unsuccessful. Viscosity of the dispersion was determined using a Brookfield viscometer using a #2 spindle after two weeks aging at room temperature and pressure.

EXAMPLE 4 AND COMPARATIVE EXAMPLES 5 AND 6

An ethylene/acrylic acid interpolymer having 15 percent by weight acrylic acid and a melt index of 24 grams/10 minutes (125° C./2.16 kg) (approximately 480 g/10 minutes at 190° C./2.16 kg) was dispersed using the recipes described in Table 3. The neutralization level for all samples was 1.5:1 (moles acid/moles base).

TABLE 3

| Example | Resin (grams) | NH4OH (grams) | NaOH (grams) | H2O (grams) |
|---|---|---|---|---|
| 4 | 10 | 1.33 | 0.45 | 88.22 |
| 5* | 10 | 2.00 | 0.00 | 88.00 |
| 6* | 10 | 0.00 | 1.35 | 88.65 |

*Comparative example only; not an example of the invention

This sample was prepared in a manner analogous to that described above. The results for this sample were also determined in the aforementioned manner. The dispersion criteria is the same as above; test results are listed in Table 4.

TABLE 4

| Example | Non-dispersible (weight percent) | Stable Viscosity (cps) | Approximate Solids Content (weight percent) |
|---|---|---|---|
| 4 | 0.04 | 48 | 10.3 |
| 5* | 22.5 | 21 | 7.8 |
| 6* | 32.4 | 18 | 7.5 |

*Comparative example only; not an example of the invention

EXAMPLE 7 AND COMPARATIVE EXAMPLES 8 AND 9

An ethylene/acrylic acid interpolymer having 15 percent by weight acrylic acid and a melt index of 20 grams/10 minutes (190° C./2.16 kg) was dispersed according to the recipes described in Table 5. The ratio of acid to base (moles:moles) was 2.5:1.

TABLE 5

| Example | Resin (grams) | NH4OH (grams) | KOH (grams) | H2O (grams) |
|---|---|---|---|---|
| 7 | 10 | 2.13 | 1.34 | 86.53 |
| 8* | 10 | 3.55 | 0.00 | 86.45 |
| 9* | 10 | 0.00 | 3.35 | 86.65 |

*Comparative example only; not an example of the invention

Dispersion test results are listed in Table 6.

TABLE 6

| Example | Non-dispersible (weight percent) | Stable Viscosity (cps) | Approximate Solids Content (weight percent) |
|---|---|---|---|
| 7 | 0.16 | 64 | 10.9 |
| 8* | 18 | 22 | 8.2 |
| 9* | 23 | 19 | 9.5 |

*Comparative example only; not an example of the invention

EXAMPLE 10 AND COMPARATIVE EXAMPLES 11 AND 12

A 10 weight percent acrylic acid copolymer with a melt index of 20 at 190° C./2.16 kg was dispersed according to the following recipes. The molar ratio of acid to base was 2.5:1. This sample was prepared in a sealed one liter stainless steel reaction kettle at a digestion temperature of 145° C. Table 7 lists the dispersion formulations and Table 8 lists the properties of the formed dispersions.

TABLE 7

| Example | Resin (grams) | NH4OH (grams) | KOH (grams) | H2O (grams) |
|---|---|---|---|---|
| 10 | 10 | 1.28 | 0.80 | 87.92 |
| 11* | 10 | 2.12 | 0.00 | 87.88 |
| 12* | 10 | 0.00 | 2.01 | 87.99 |

*Comparative example only; not an example of the invention

TABLE 8

| Example | Non-dispersible (weight percent) | Stable Viscosity (cps) | Approximate Solids Content (weight percent) |
|---|---|---|---|
| 10 | 0.4 | 140 | 10.5 |
| 11* | 88 | 14 | 1.2 |
| 12* | 72 | 22 | 3.2 |

*Comparative example only; not an example of the invention

Experimental Procedures for Examples 13–17

In example 13–17, a 0.8 mole ratio of a cation in a dispersion means that 80 percent of the acrylic acid has been neutralized by the cation. Mole ratio calculations for neutralization were arrived at by determining the concentration of acrylic acid comonomer in a known weight of resin. Multiplying the weight of the resin to be dispersed by the percent acrylic acid in the copolymer gives the weight of acrylic acid in the sample to be dispersed. The number of moles of acrylic acid were found by dividing the weight of acrylic acid in the sample by its molecular weight. Ratioing the moles of AA to the neutralizing cation specifies the moles of base needed to neutralize the polymer. The moles and molecular weight were used to determine weight of base to be added.

Two procedures were used to prepare the case examples. For examples 13, 16 and 19, the dispersions were prepared in a glass reaction kettle. For examples 14, 17, and 18, and comparative example 16, the dispersions were prepared in a 4 liter Autoclave Engineer's stirred reactor. Non-dispersibles were determined by the procedure described earlier. Viscosity measurements were determined using a Brookfield Viscometer.

Particle Size Analysis Determination

A Hydrodynamic Chromatograph (HDC) instrument was used to determine particle size. The system was standardized using 24 monodispersed polystyrene standards purchased from Duke Scientific Corporation in Palo Alto, Calif. The 24 standards ranged from 210 to 9500 angstroms. The effective window for particle size analysis is 100 to 10,000 angstroms (due to the size of the monodispersed polystyrene standards). The primary difference in the instrument's configuration used in the PRIMACOR ® dispersion analysis was the change in pH of the carrier eluent. Originally, the instrument was set up to use an eluent with a pH of 3 as the carrier. An acidic eluent would react with the dispersions that were to be analyzed and particle sizes would be inaccurate. An alternate eluent with a pH of 7.6 was found to be an effective substitute.

EXAMPLE 13

A dispersion was formed from PRIMACOR ® 5991, an ethylene/acrylic acid interpolymer having 20 percent AA and 2600 MI. This sample was dispersed using lithium hydroxide and ammonium hydroxide in the glass reaction kettle dispersion procedure. The reactants and reagents are shown below.

| Component | Quantity | Weight Percent |
| --- | --- | --- |
| Ethylene Acrylic Acid Co-polymer | 280 grams | 40.05 |
| Lithium Hydroxide + 1 H$_2$O | 4.9 grams | 0.7 |
| Ammonium Hydroxide solution | 7.29 grams | 1.04 |
| Distilled Water | 407 grams | 58.21 |

Note: Ammonium hydroxide solution was a 27.21 percent, specific gravity 0.900 @ 22.5° C. Lithium hydroxide was a monohydrate powder.

Dispersion Properties

Viscosity—4155 centipoise
Non-dispersibles (evaluated using a 250 ml. sample)—0.04 percent
pH—7.85
Mean volume diameter particle size—2489 Angstroms Previously, a 40 percent solids dispersion of PRIMACOR ® 5980 had been prepared with a 0.15 mole ratio ammonium hydroxide and 0.15 mole ratio potassium hydroxide. To demonstrate equivalent substitution of lithium and sodium cations for potassium, four 25 percent solids dispersions of PRIMACOR ® 5980 were prepared. Lithium hydroxide, sodium hydroxide, potassium hydroxide, and ammonium hydroxide dispersions were prepared at 0.8 mole ratio. Analysis via Hydrodynamic Chromatography revealed similar particle size distribution curves. Based on these results, lithium and sodium hydroxides could be substituted at the same mole ratio as the potassium hydroxide in the 40 percent mixed base system.

EXAMPLE 14

PRIMACOR ® 3460 Ethylene-acrylic acid copolymer (9.8 Percent AA, 20 MI) was dispersed. A 25 percent solids 1.0 mole ratio ammonium hydroxide, 0.6 mole ratio potassium hydroxide dispersion was prepared in the 4 liter autoclave. The components were allowed to digest for 16 hours. At that time, heaters were turned off and water was valved through the cooling coil. The dispersion was cooled to 100° F. (38° C.) and sampled. The reagents and reactants are shown below.

| Component | Quantity | Weight Percent |
| --- | --- | --- |
| Ethylene Acrylic Acid Co-polymer | 750.0 grams | 24.87 |
| Potassium Hydroxide solution | 76.2 grams | 2.53 |
| Ammonium Hydroxide solution | 66.5 grams | 2.20 |
| Distilled Water | 2123.5 grams | 70.40 |

Note: Ammonium hydroxide solution was 26.04 percent with a specific gravity 0.904 measured at 22.0° C. Potassium hydroxide solution was 45 percent with a specific gravity of 1.44 measured at 22.5° C.

Dispersion Properties

Viscosity—525 centipoise
Non-dispersibles (evaluated using a 250 ml. sample)—0.03 percent
pH—10.80
Mean volume diameter particle size—1486 Angstroms

COMPARATIVE EXAMPLE 15

Mixed base dispersion were attempted using lower percent co-monomer resins (5 percent AA, 1400 MI) but were unsuccessful.

EXAMPLE 16

An EAA resin containing 29.5 percent acrylic acid comonomer (720 MI) was dispersed. A 40 percent solids dispersion was prepared using 0.1 mole ratio ammonium carbonate and 0.1 mole ratio potassium carbonate. Loss of carbon dioxide occurred at 60° C. The reactor was allowed to remain at the temperature (approximately 1 hr.) until foaming ended. The terperature was then raised to 95° C. and the resin was allowed to digest for 2 hours. The formulation was prepared using the glass reaction kettle. The reactants and reagents are shown below.

| Component | Quantity | Weight Percent |
| --- | --- | --- |
| Ethylene Acrylic Acid Co-polymer | 280 grams | 40 |
| Potassium Carbonate (anhydrous) | 7.91 grams | 1.13 |
| Ammonium Carbonate (anhydrous) | 5.51 grams | .79 |
| Distilled Water | 406.58 grams | 58.08 |

Dispersion Properties

Viscosity—3200 centipoise
Non-dispersibles (evaluated using a 250 ml. sample)—0.05 percent
pH—6.75
Mean volume diameter particle size—1518 Angstroms Previous Hydrodynamic Chromatograph data comparing a $K_2CO_3$/$NH_4OH$ dispersion with a KOH/$NH_4OH$ dispersion had shown similar particle size distributions. These two dispersions were prepared at identical percent solids concentration (45 percent) and equivalent mole ratio concentrations. Based on the results of these dispersions, carbonates and bicarbonate salts could be substituted for any strong or weak base.

EXAMPLE 17

An EAA resin (5 MI, 15 percent AA) was dispersed in the 4 liter autoclave. The relatively low melt index required an elevated temperature of 295° F. (146° C.) to soften and allow ammonium ions to penetrate the resin and digest. Due to the relatively high acrylic acid concentration, less neutralization was required. A 25 percent solids dispersion was prepared with ammonium hydroxide at 0.7 mole ratio and potassium hydroxide at 0.5 mole ratio. The reactants and reagents are shown below:.

| Component | Quantity | Weight Percent |
| --- | --- | --- |
| Ethylene Acrylic Acid Co-polymer | 750 grams | 24.78 |
| Potassium Hydroxide solution | 78.03 grams | 2.58 |
| Ammonium Hydroxide solution | 116.64 grams | 3.85 |
| Distilled Water | 2082.3 grams | 68.79 |

Note: Ammonium Hydroxide solution was 27.21 percent with a specific gravity 0.900 measured at 22.5° C. Potassium Hydroxide solution was 45 percent with a specific gravity of 1.44 measured at 22.5° C.

Dispersion Properties

Viscosity—10,300 centipoise
Non-dispersibles (evaluated using a 250 ml. sample)—0.04 percent
pH—10.50
Mean volume diameter particle size—989 Angstroms Although this dispersion was not optimized, as indicated by the high viscosity, it was apparent that the particle size was low. The dispersion was relatively translucent. Mole ratios could be lowered further to reduce viscosity, although some increase in particle size would be expected. Reducing the mole ratio of the strong cation would free some acrylic acid and improve adhesion.

EXAMPLE 18

PRIMACOR ® 5980 (20 percent AA, 300 MI) was dispersed in a one liter glass reaction kettle. A 50 percent solids dispersion was prepared using 0.1 mole ratio ammonium hydroxide and 0.1 mole ratio potassium hydroxide. Reaction temperature was set at 95° C. and the resin was allowed to digest for 2 hours with agitation. The reactants and reagents are shown below:

| Component | Quantity | Weight Percent |
| --- | --- | --- |
| Ethylene Acrylic Acid Co-polymer | 250 grams | 50 |
| Potassium Hydroxide solution | 8.64 grams | 1.73 |
| Ammonium Hydroxide solution | 4.34 grams | 0.87 |
| Distilled Water | 237.02 grams | 47.40 |

Note: Ammonium Hydroxide solution was 27.21 percent with a specific gravity 0.900 measured at 22.5° C. Potassium Hydroxide solution was 45 percent with a specific gravity of 1.44 measured at 22.5° C.

Dispersion Properties

Viscosity—3150 centipoise
Non-dispersibles (evaluated using a 250 ml. sample)—0.0 percent
pH—7.85
Mean volume diameter particle size—2869 Angstroms

EXAMPLE 19

PRIMACOR ® 5990 (20 percent AA, 1600 MI) was dispersed in a one liter glass reaction kettle using an amine for the weak base. A 45 percent solids dispersion was prepared using 0.15 mole ratio ethanol amine and 0.1 mole ratio sodium hydroxide. Reaction temperature was set at 95° C. and the resin was allowed to digest for 2 hours with agitation. The reactants and reagents are shown below.

| Component | Quantity | Weight Percent |
| --- | --- | --- |
| Ethylene Acrylic Acid Co-polymer | 225 grams | 44.84 |
| Sodium Hydroxide | 5.72 grams | 1.14 |
| Monoethanol Amine | 7.56 grams | 1.51 |
| Distilled Water | 263.52 grams | 52.51 |

Note: Sodium Hydroxide solution was 33 percent with a specific gravity of 1.313 measured at 22.5° C.

Dispersion Properties

Viscosity—20,000 centipoise
Non-dispersibles (evaluated using a 250 ml. sample)—0.08 percent
pH—7.75
Mean volume diameter particle size—2287 Angstroms PRIMACOR ® 5980 was dispersed with ethanol amine at a 1 mole ratio and compared to a 25 percent solids ammonia dispersion. The clarity of the amine dispersion indicated comparable particle size although the viscosity was significantly higher. To minimize this high viscosity in a high solids dispersion, PRIMACOR ® 5990 was selected in the preparation. A lower molecular weight distribution resin would result in a smaller particle size dispersion. Observation of the reaction indicated that a successful dispersion was prepared. The viscosity of the finished product was 1500–2000 mpas. Over night, the dispersion viscosity increased dramatically.

COMPARATIVE EXAMPLE 20

In an attempt to reproduce the latex/dispersion described in Example 13 of U.S. Pat. No. 3,799,901, the following reactants were added sequentially to a 4 liter stainless steel reactor vessel:

| Order of addition | Reactant | Total Quantity (grams) |
| --- | --- | --- |
| 1 | Distilled Water | 1642 |
| 2 | EAA | 571 |
| 3 | KOH | 1158 |
| 4 | 28 percent NH4OH | 97.98 |

The reactants were added in the same ratio quantities as those used in U.S. Pat. No. 3,799,901. The available ethylene/acrylic acid (EAA) interpolymer which most closely matched the physical properties of the interpolymer used in Example 13 of U.S. Pat. No. 3,799,901 had a melt index of about 17.5 grams/10 minutes and about 12.92 percent (by weight of the interpolymer) of acrylic acid. The potassium hydroxide (KOH) was added as solid pellets. The ammonium hydroxide (NH₄OH) was added as an aqueous solution at a concentration of about 28 percent (by weight).

The distilled water was added to the reactor first, followed by the polymer sample. The entire quantity of the KOH was added next, followed by 49.99 grams of the aqueous ammonium hydroxide solution. The reactor was immediately closed and padded to 40 pounds per square inch (psi) with nitrogen gas and checked for seal integrity. The agitator was started and maintained at a nominal speed of 300 revolutions per minute (rpm). The reactor temperature control was set at 120° C. The process over-temperature (high temperature alarm) was set at 150° C. An immediate and rapid increase in process temperature was observed from ambient to 80° C. The reactor was closely monitored during the initial stirring. After 45 minutes, the process temperature reached 120° C. The polymer was allowed to digest for 3 hours.

At the end of the initial digest, the reactor was allowed to cool to ambient and then opened. An additional 49.99 grams of 28 percent NH₄OH was added to the reactor at this time. The polymer had not begun digesting and the stirrer motor amperage was excessively high. The reactor was again sealed, padded with nitrogen and checked for seal integrity. The reactor temperature was set to 120° C. The mixture digested for 4 hours after the reactor temperature reached 120° C. The stirrer motor amps remained high throughout this digestion.

At the end of the second digestion, the reactor was opened. No digested (i.e., swollen) polymer was observed, nor was the polymer dispersed. The relatively clear solution had no visibly dispersed polymer. Effectively all of the polymer coated the stirrer and the reactor walls and could not be easily removed. The percent non-dispersibles was effectively 100 percent for this experiment.

We claim:

1. An aqueous dispersion of at least one ethylene/$\alpha,\beta$-unsaturated carboxylic acid interpolymer produced by a process comprising contacting the interpolymer(s) in a stirred aqueous medium with a mixture of bases having at least 0.2 equivalents of base per mole of $\alpha,\beta$-unsaturated carboxylic acid, said base being a mixture of monoethanolamine, diethanolamine, or ammonium hydroxide and at least one alkali metal hydroxide in a total ratio of from about 1.5 to about 3 moles of monoethanolamine, diethanolamine, or ammonium hydroxide per 1 mole of alkali metal hydroxide, thereby forming a dispersion having at least 10 weight percent of dispersed solids, total weight basis, and not more than 1 weight percent of non-dispersibles, based on the weight of the interpolymer, the improvement characterized by the dispersion having a mean volume diameter particle size within the range of 100–10,000 Angstroms.

2. The aqueous dispersion of claim 1 wherein the solids content of the dispersion is 25 weight percent or more, total weight basis.

3. The aqueous dispersion of claim 1 wherein the mixture of bases is a mixture of ammonium hydroxide and at least one alkali metal hydroxide.

4. The aqueous dispersion of claim 3 wherein the alkali metal hydroxide is lithium hydroxide, potassium hydroxide or sodium hydroxide.

5. The aqueous dispersion of claim 4 wherein the mixture is ammonium hydroxide and potassium hydroxide.

6. The aqueous dispersion of claim 5 wherein the ethylene/$\alpha,\beta$-unsaturated carboxylic acid interpolymer is an ethylene/acrylic acid interpolymer.

7. The aqueous dispersion of claim 6 wherein the mixture of ammonium hydroxide and potassium hydroxide is at a total ratio of from 1.5:1 to 3:1.

8. The aqueous dispersion of claim 7 wherein the ammonium hydroxide:acrylic acid molar ratio is 1:1 and the potassium hydroxide:acrylic acid molar ratio is 0.6–0.8:1.

9. The aqueous dispersion of claim 1 wherein the aqueous medium additionally contains an aqueous alcohol of 1 to 4 carbon atoms.

10. The dispersion of claim 1 further characterized as having a mean volume diameter particle size within the range of 200–3000 Angstroms.

11. Film produced from the dispersion of claim 1.

* * * * *